United States Patent [19]

Bosard

[11] 4,288,704

[45] Sep. 8, 1981

[54] WIND DRIVEN GENERATOR WITH BLADE PROTECTING MEANS

[76] Inventor: James H. Bosard, 83-02 Dongan Ave., Elmhurst, N.Y. 11373

[21] Appl. No.: 970,837

[22] Filed: Dec. 19, 1978

[51] Int. Cl.³ .................. F03D 9/00; H02P 9/04; F03D 7/00; F03B 13/00
[52] U.S. Cl. ........................... 290/55; 290/54; 290/44; 415/4
[58] Field of Search ............ 290/44, 54, 55, 43; 415/2, 3, 4

[56] References Cited

U.S. PATENT DOCUMENTS

| | | | |
|---|---|---|---|
| 31,121 | 1/1861 | Holmes | 415/4 |
| 310,237 | 1/1885 | Wegley | 415/4 |
| 356,634 | 1/1887 | Godfrey | 415/4 |
| 410,360 | 9/1889 | Ham | 415/4 |
| 549,398 | 11/1895 | Schon | 415/4 |
| 648,442 | 5/1900 | Scott | 415/4 |
| 774,168 | 11/1904 | Fornander | 290/44 |
| 1,099,602 | 3/1913 | Houtz | 415/4 |

Primary Examiner—J. V. Truhe
Assistant Examiner—John B. Conklin

[57] ABSTRACT

A wind driven generator comprising a shaft having one end rotatably mounted in the apex of a conical wind deflector, a wind wheel keyed on the shaft in an open housing behind the deflector. An armature is mounted on the other end of the shaft in close proximity to a stator in a housing so that when the shaft is rotated by the wind the armature rotates in the stator to generate an electric current. Semi-circular perforated shields are hinged in front of the wind wheel so as to cover the space between the periphery of the housing and the outer edges of the deflector. The shields are held open by a counter weight until the wind attains an excessive velocity.

3 Claims, 5 Drawing Figures

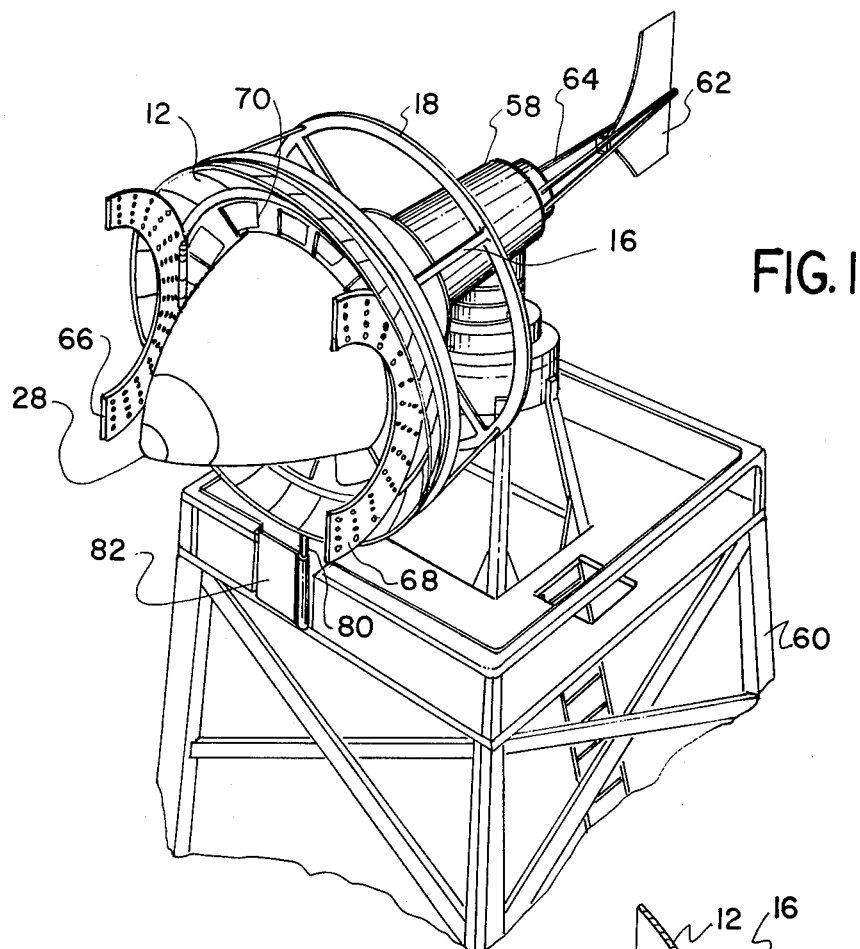
FIG. 1
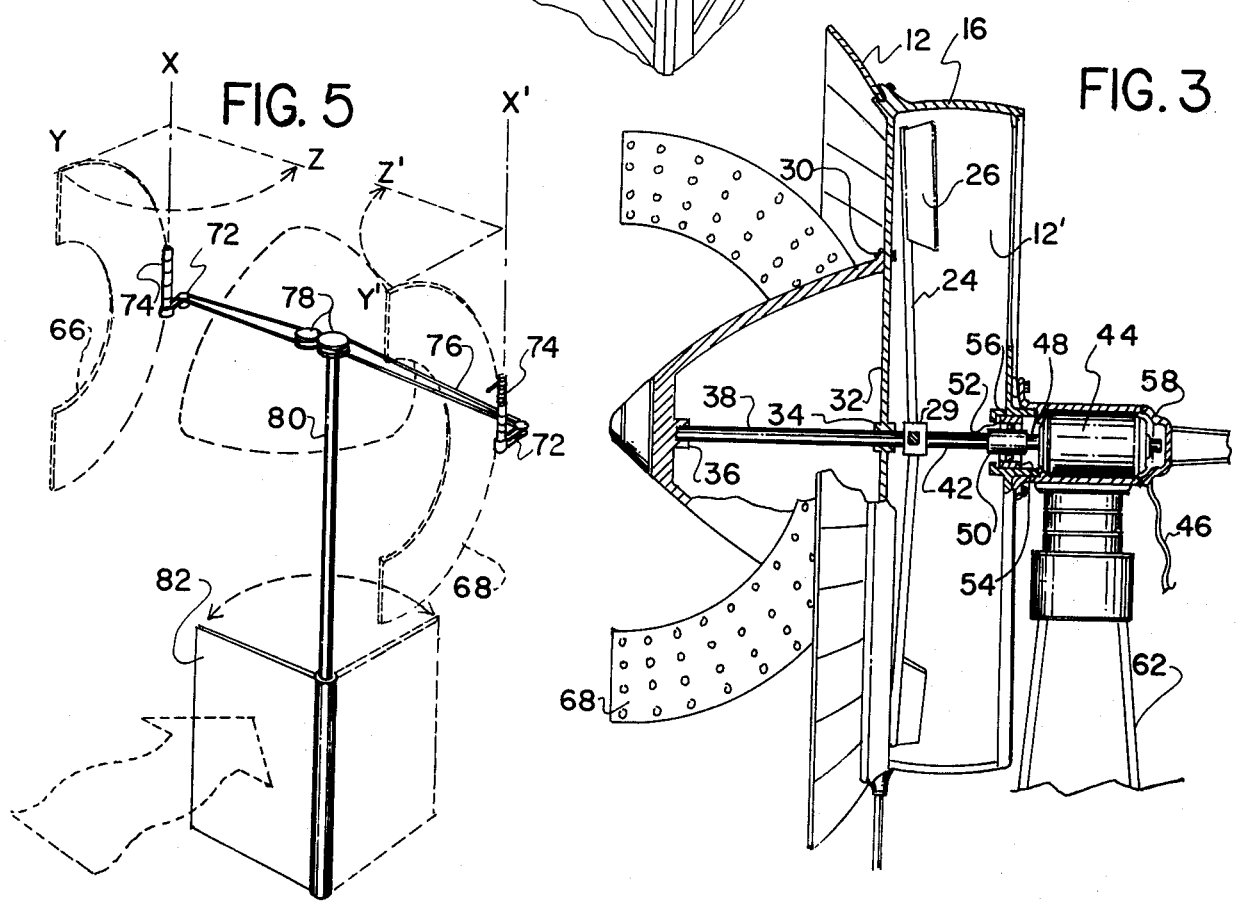
FIG. 5
FIG. 3

WIND DRIVEN GENERATOR WITH BLADE PROTECTING MEANS

FIELD OF THE INVENTION

This invention relates generally to a wind driven generator having blade protecting means.

DESCRIPTION OF THE PRIOR ART

The prior art, as exemplified by U.S. Pat. Nos. 1,183,219; 3,473,038; 1,142,538; 1,064,026; 2,080,955; and 2,417,022 is generally illustrative of the pertinent art but the aforementioned patents are non-applicable to the present invention. While the prior art expedients are generally acceptable for their intended purposes only, they have not proven entirely satisfactory in that they are either complex and expensive to manufacture, or bulky and inconvenient to use, or to operate. As a result of the shortcomings of the prior art, typified by the above, there has developed a substantial need for improvement in this field.

The principal object of this invention is to provide a device or article of this character which combines simplicity, strength and durability in a high degree, together with inexpensiveness of construction owing to a minimum of parts so as to encourage widespread use thereof.

Additional objects and advantages of the invention will be set forth in part in the description which follows and in part will be obvious from the description, or may be realized by practice of the invention, the objects and advantages being realized and attained by means of the instrumentalities and combinations particularly pointed out in the appended claims.

SUMMARY OF THE INVENTION

This invention resides in a wind driven generator comprising a shaft having one end rotatably mounted in the apex of a conical wind deflector, a wind wheel keyed on the shaft in an open housing behind the deflector. An armature is mounted on the other end of the shaft in close proximity to a stator in a housing so that when the shaft is rotated by the wind the armature rotates in the stator to generate an electric current. Semi-circular perforated shields are hinged in front of the wind wheel so as to cover the space between the periphery of the housing and the outer edges of the deflector. The shields are held open by a counter weight until the wind attains an excessive velocity.

BRIEF DESCRIPTION OF THE DRAWING

In the accompanying drawing, in which is shown one of the various possible illustrative embodiments of this invention, wherein like reference character identify the same or like parts:

FIG. 1 is an isometric view of the wind generator according to the present invention;

FIG. 3 is a side elevation partly in section of the device;

FIG. 5 is a schematic view showing operation of the wind shields.

Figure 4:
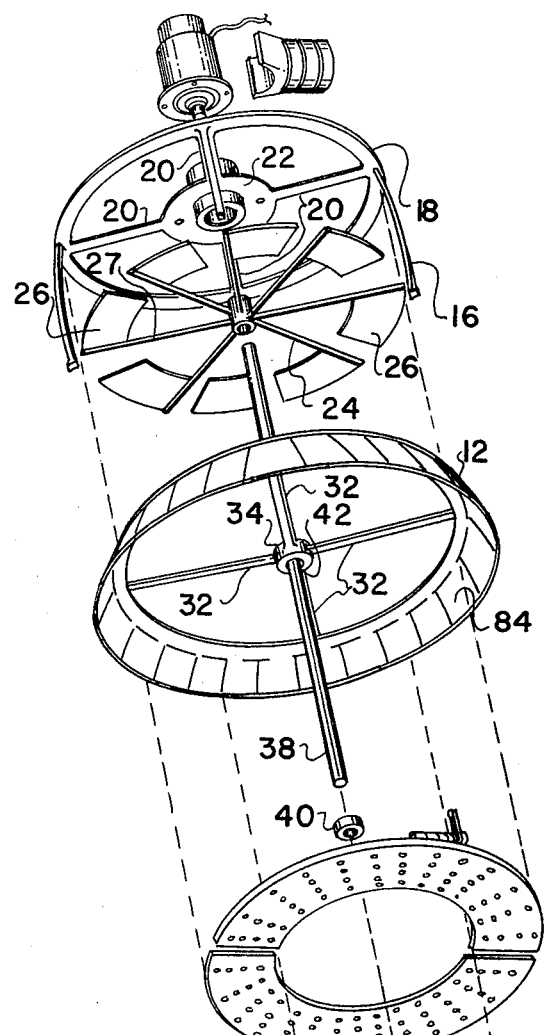
FIG. 4 is an exploded view thereof.
Figure 2:
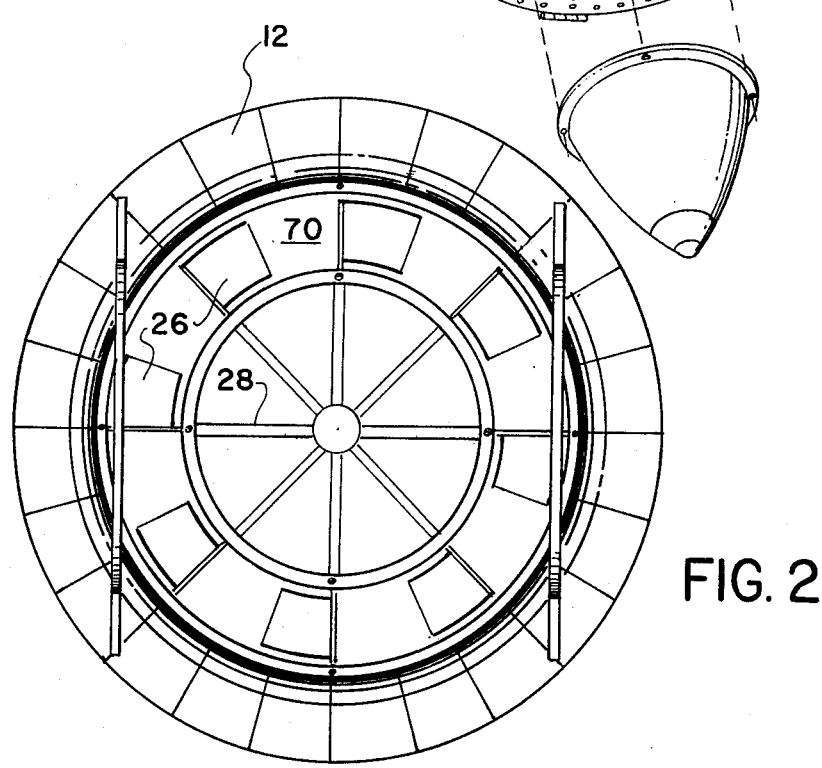
FIG. 2 is a front elevation of same shown with its wind shields open.

DESCRIPTION OF THE PREFERRED EMBODIMENTS:

With reference to the drawing, there is shown and illustrated a wind generator constructed in accordance with the principles of the invention and designated generally by reference character 10. The illustrated tangible embodiment of the invention includes a circular hollow metal or plastic open housing 12' formed as a semi-concave flared disc 12 to which is secured by means of side brackets 16 a flat open disc 18. Spokes 20 hold a hub 22 in the center of disc 18. An impeller fan or wind wheel 24 has a plurality of rectangular blades 26, fixed at the outer end of rods 27 radiating from hub 29. The blades are fixed by one edge and pitched or inclined rearwardly. A conical wind deflector 28 is secured by screws 30 to the spokes 32 of disc 12 radiating from central hub 34. The nose of deflector 28 is formed internally with a bearing 36 in which is journalled one end of shaft 38, this end being held in place against longitudinal movement by stop 40 (FIG. 4). Shaft 38 passes through central opening 42 in hub 34 and has keyed thereon the hub 29 of impeller fan 24 which rotates it. The inward end of shaft 38 is linked to generator 44 so as to rotate its armature relative to its stator and thus generates current taken off by wires 46 (FIG. 3). This connection preferably is effected by uniting shaft 38 to shaft 48 of the generator 44. The by coupling 50 supported by ball bearings 52 in a sleeve 54 fixed to opening 56 of rear disc 18. Secured to the back of disc 18 is a housing 58 for generator 44 housing is mounted on support 60 which may be at ground level or at any height above ground.

In a simplified version of the invention, the armature of the generator can be mounted directly on the end of the shaft 42 in close proximity to the stator which then replaces housing 58.

A tail vane 62 is secured to four supporting bars 64 extending longitudinally from the back of housing 58.

To protect the blades 26, windwheel 24 from high winds such as those of cyclone force, movable perforated shields 66, 68 are hinged to the front of the space 70 between the outer periphery of deflector 28 and the inner periphery of concave disc 12 where are located blades 24. Each shield is hinged at its center to supports 72 secured to deflector 28. Hinges 74 are spring biased to normally keep shields open. Supports 72 are connected by cables 76 to twin pulleys 78 which move together. One pulley is fixed to the end of shaft 80 to whose other end is fixed a weighted wind vane 82. The vane 82 is calibrated so that it will turn and thus close shields 66, 68 when the wind exceeds a certain speed.

Deflector cone 28 serves to provide power to the outside of blades 26 for additional leverage; the depth of cone 28 preferably is twice the length of the peripheral wall 84 of disc 12.

The impeller fan blades 24 can be made of light material such as balsa wood, aluminum or light metal (such as aluminum alloys). These latter are used also for the other components of the assembly.

Preferably, the support 60 will be pivoted to orient the assembly through three-hundred-sixty degrees to benefit from local advantages such as wind reflecting from trees or buildings.

The operation and use of the invention hereinabove described will be evident to those skilled in the art to which it relates from a consideration of the foregoing.

The present invention is believed to accomplish among others all of the objects and advantages herein set forth.

Without further analyses, the foregoing will so fully reveal the gist of this invention that those skilled in the art can by applying current knowledge thereto readily adapt it for various applications without omitting certain features which can constitute essential characteristics of the generic or specific aspects of this invention. Therefore, a more lengthy description is deemed unnecessary.

It is intended that various changes may be made in this invention in the practical development thereof, if desired. Such changes are comprehended within the meaning and range of equivalency of the following claims. The invention, therefore, is not to be restricted except as is necessitated by the prior art.

Having thus described the invention, what is claimed as new and to be secured by Letters Patent is:

1. An electric current producing windmill comprising a windwheel having blades thereon; a generator; a housing for said windwheel; said housing includes a front disc having an open circular area and a dished peripheral wall; a conical wind deflector mounted centrally of said disc, and forward of the windwheel, for deflecting wind to the outer part of said blades; a shaft having one end rotatably mounted inside the forward tip of said deflector; said windwheel being keyed thereon; the other end of said shaft being coupled to one shaft of the generator for rotating same; and a pair of perforated semi-circular shields, one of which is hinged on each side of said deflector; said shields linked to means to pivot said shields about their respective hinges to a closed position for automatically covering the space between the outer periphery of said deflector and the inner periphery of said wall when the wind velocity exceeds a given speed, said perforated shields allowing wind currents to flow through perforations in the shield so as to power the windmill and its coupled generator when the shields are in the said closed position.

2. The invention as recited in claim 1, wherein each said shields is hinged by a spring biased hinge that serves as means for urging the associated shield normally to an open position and with each shield connected to a rotatable shaft having a weighted vane that serves as means adapted to rotate to close said shields when the wind that strikes said vane exceeds a givne velocity.

3. The invention as recited in claim 1, further including a base adapted fitted with pivot means to turn around three-hundred-sixty degrees.

* * * * *